July 16, 1935.　　　　R. E. S. GEARE　　　　2,008,353

TRANSMISSION BELT

Filed July 21, 1933

Inventor
R. E. S. Geare.

By Edwin S. Clarkson
Attorney

Patented July 16, 1935

2,008,353

UNITED STATES PATENT OFFICE 2,008,353

TRANSMISSION BELT

Randolph E. S. Geare, Philadelphia, Pa., assignor to L. H. Gilmer Co., Tacony, Philadelphia, Pa., a corporation of New Jersey Application July 21, 1933, Serial No. 681,638

3 Claims. (Cl. 74—232)

This invention relates to certain new and useful improvements in transmission belts for transmitting power from one band wheel or pulley to another, and particularly to means for increasing the grip or traction pull of a power belt on a pulley, to prevent slippage, and reduce wear and tear and secure greater transmission efficiency, without increasing the tension of the belt.

Heretofore it has been a common practice, particularly on large belt drivers, to provide a smaller "contactor" belt to ride upon a power belt to squeeze the power belt against the pulleys and to thereby secure close, slipless contact at all times. This requires, however, the use of two belts in place of one, at considerable additional initial expense, which is increased by the reduction in the life period of usefulness of the belts, due to their wear through rubbing contact with one another.

One object of my present invention is to provide a non-slipping and close-gripping transmission belt which overcomes the above-mentioned objections to single power belts and to combination power and contactor belts, and which embodies in a single or unitary belt structure a pulling element and a contactor element operating to squeeze the pulling element against the pulleys for an effective pull, thus doing away with the expense of using separate power and contactor belts and the attendant objections.

Another object of my invention is to provide a combined pulling and contactor belt in which load carrying cords or their equivalent are employed in the belt structure in connection with non-extensible contactor cords or their equivalent operating as squeezing and stretch-preventing elements, whereby slipping and stretching of the belt is prevented and provision made for securing close grip of the belt on the pulleys at all times.

Still another object of my invention is to provide a belt which, while having the advantages stated, is of great strength and highly flexible so as to pass freely about difficult and troublesome pulley arrangements, and which by reason of its great strength and high flexibility will allow center distances between connected pulleys to be reduced and a more effective gripping engagement and pull on pulleys of smaller diameters to be obtained than is possible with belts of ordinary construction.

The invention consists of the features of construction, combination and arrangement of parts, hereinafter fully described and claimed, reference being had to the accompanying drawing, in which:—

Figure 1:
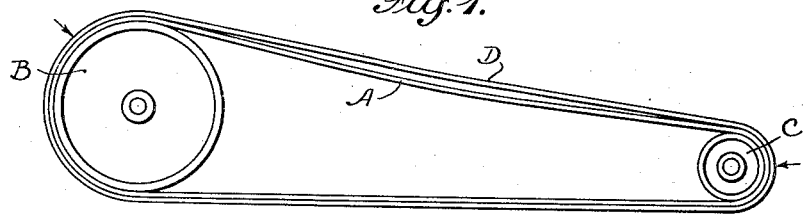
Fig. 1 is a view showing a conventional mode of using a power belt and a contactor belt riding thereon in order to secure a close gripping engagement between the power belt and the pulleys connected thereby.

Referring now more particularly to the drawing, Fig. 1 illustrates a practice employed, particularly on large belt drives, of securing a good driving connection between the power belt A and the pulleys B and C connected thereby. Because of the length and weight of the belt and its stretching tendency, the belt is liable to slip about the pulleys and its upper stretch sags, with the result that the traction or pulling power of the belt is considerably reduced, and the resistance to movement of the belt increased, with a consequent loss of applied power. This difficulty increases with the length and width of the belt and is a troublesome factor in both long and difficult belt drives. This objection may be largely overcome by the use of a smaller and lighter outer "contactor" belt D applied as a rider about the outer surface of the belt A and operating to draw the belt A, at the points indicated by the arrows, against the pulleys B and C and cause the same to tightly hug and grip the pulleys with sufficient force to prevent slippage. This practice, however, is expensive, because it requires the use of two belts instead of one, and necessitates repairs and renewal of the belts at more frequent intervals on account of wear and tear due to their rubbing contact. Moreover, this cumbersome type of double belt drive requires greater center distances between pulleys and cannot be used in some pulley arrangements.

My invention provides a belt which overcomes the above noted objections to double belt drives and combines, in a single or unitary belt structure, all the desirable advantages of the double belt drive without its disadvantages, and having increased efficiency; that is to say, my invention provides a combined power and contactor belt in single belt form, which requires less running space and distance between pulley centers than a double belt drive, and which is of much greater flexibility and greater gripping power and durability and may be supplied and operated at less expense.

In carrying my invention into practice, I provide a rubberized fabric belt 1 comprising a core 2 of a tough pliable rubber in which are embedded two or more plies, layers or groups of inner strong load pulling elements or cords 3 and a group of outer inextensible or non-stretching heavy contactor elements or cords 4. The cords 3 and the portion of the core in which they are invested form the inner power belt portion A' of the unitary belt, while the cords 4 and the portion of the core in which they are invested form the outer contactor belt portion of the unitary belt. About this core and its cords is placed an outer wrapper 5 of heavy rubberized fabric. This encloses and protects an inner or second wrapper 5a which in turn encloses the core and cords and completes the formation of the "two belts in one" structure.

Figure 4:
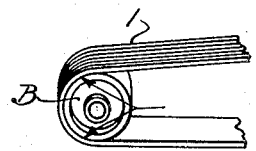
Fig. 4 is a view similar to Fig. 1, showing a driving advantage secured by my improved belt.
Figure 5:
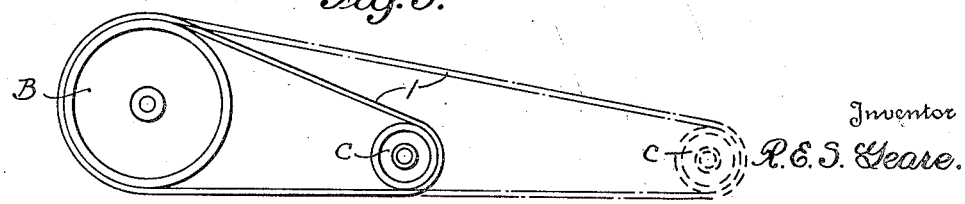
Fig. 5 is a view showing another driving advantage secured by my improved belt.

As a result of this construction there is provided a belt in which strong load carrying cords or elements invested in rubber are employed to form an inner belt to transmit power and strong, inextensible contactor cords or elements invested in rubber are employed to form an outer belt to squeeze the load carrying cords of the inner belt against the pulleys, the two belts being combined in one by making the rubber investment portions of unitary character and enclosing the resulting core in a protecting wrapper of strong and durable type. This belt is compact, strong and durable and highly flexible and, as the contactor cords have practically no stretch during the lifetime of the belt these cords prevent elongation of the belt without impairing its elasticity and act to draw or squeeze the load carrying or pull cords tightly against the pulleys in rounding the same so as to prevent slipping and secure a highly efficient pulling grip on opposite sides of the axis of the engaged pulley in its orbit of travel, as shown by the arrows in Fig. 4. Because of the flexibility and non-stretching character of the belt the efficiency of the belt is maintained substantially as long as it is in condition to render service and the belt is given an effective grip and pull over pulleys of both large and small diameters. This adapts the belt for use in difficult and troublesome drives about pulley arrangements where double-belt drives cannot be used and reduces the required center distances between pulleys as compared with stiffer belt drives, as indicated by the comparative full and dotted line arrangements shown in Fig. 5, which is a distinctive advantage where floor space must be conserved. By providing a belt which does double duty as a power belt and a contactor belt, the expense and difficulties of employing a double-belt drive are avoided in a simple and effective manner.

It will, of course, be understood that the invention may be embodied in endless belts as well as in non-endless belting from which a belt may be formed by cutting off a strip of required size from a roll and coupling the ends thereof together by means of connectors in a well known way, as the non-stretching character of the belt ensures a tight holding of the connectors in the belt when coupling two ends together. In either form of belting, i. e., endless or non-endless, I may substitute for the pull cords pull strips or layers of heavy inextensible fabric, which construction is sometimes found preferable for roll belting for making long and heavy belts, and in some cases I may, particularly for the lighter belts, cement or otherwise firmly secure the contactor cords to the outer surface of the core or but partially embed such cords in the core instead of fully investing cords in the core. These and other changes obviously fall within the spirit and scope of my invention.

From the foregoing description, taken in connection with the drawing, the construction, mode of operation and advantages of my invention will be readily understood and appreciated by those versed in the art without a further and extended description. While the construction shown and described for exemplificative purposes is preferred, it will be understood that changes in the form, arrangement and details of construction of the invention may be made within the scope of the appended claims, without departing from the spirit or sacrificing any of the advantages of the invention.

Figure 2:
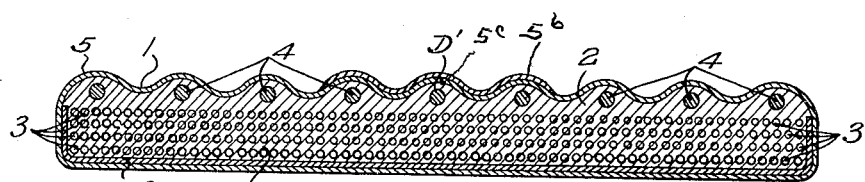
Fig. 2 is a cross-section through my improved combined power and contactor belt on an enlarged scale.
Figure 3:
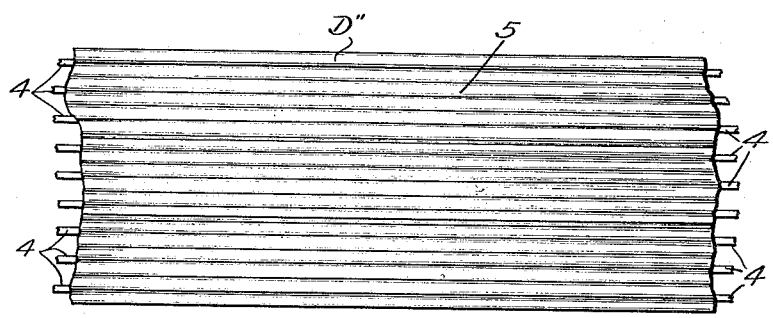
Fig. 3 is a fragmentary plan view of the same.

As will be seen in Figure 2, the side edges of the wrapper 5 meet in a butt splice as at 5c on top of the belt and the joint between these edges is covered by means of a strip 5b and is vulcanized in place.

What I claim is:—

1. In a flat drive belt, the combination of load pulling elements extending longitudinally of the belt, and non-stretchable contactor elements disposed between the load pulling elements and the outer surface of the belt for squeezing said pulling elements radially inward toward a pulley in the travel of the belt thereabout to effect a tight gripping engagement of the pulling elements with the pulling surface, and a jacket enclosing the said elements.

2. In a flat belt, the combination of an elastic core, rows of load pulling cords embodied in said core, non-stretchable contactor cords extending longitudinally of the belt and located between the load pulling cords and the outer surface of the belt for forcing said pulling elements radially inward toward a pulley in the travel of the belt thereabout to effect a tight gripping engagement of the belt with the pulley, and a protective jacket enclosing the said elements.

3. In a flat belt, the combination of an elastic core, rows of load pulling cords embodied in said core, non-stretchable contactor cords extending longitudinally of the belt and located between the load pulling cords and the outer surface of the belt for forcing said pulling elements radially inward toward a pulley in the travel of the belt thereabout to effect a tight gripping engagement of the belt with the pulley, and a protective jacket enclosing the said elements, the outer surfaces of the core and jacket being longitudinally corrugated and the non-stretchable contactor cords being embedded in said corrugated outer surface of the belt.

RANDOLPH E. S. GEARE.